United States Patent [19]

Chamoulaud

[11] Patent Number: 5,209,109
[45] Date of Patent: May 11, 1993

[54] DEVICE FOR DETERMINING THE QUANTITY OF WATER REQUIRED BY A CULTIVATION MEDIUM, AND A PLANT TRAY ADAPTED TO IMPLEMENTING THE DEVICE

[76] Inventor: Michel Chamoulaud, 46, rue Louis Coullet, 33700 Merignac, France

[21] Appl. No.: 842,332
[22] PCT Filed: Jul. 25, 1991
[86] PCT No.: PCT/FR91/00615
  § 371 Date: Mar. 26, 1992
  § 102(e) Date: Mar. 26, 1992
[87] PCT Pub. No.: WO92/01365
  PCT Pub. Date: Feb. 6, 1992

[30] Foreign Application Priority Data
Jul. 26, 1990 [FR] France ................. 90 09802

[51] Int. Cl.$^5$ ........................ G01N 5/02
[52] U.S. Cl. ................. 73/73; 73/322.5; 47/79
[58] Field of Search ........ 73/73, 305, 309, 322.5; 137/78.2, 78.3; 47/48.5 R, 79

[56] References Cited

U.S. PATENT DOCUMENTS

| | | | |
|---|---|---|---|
| 585,449 | 6/1897 | Rockwell | 73/322.5 |
| 966,720 | 8/1910 | Tilden | 73/322.5 |
| 1,255,093 | 6/1918 | Harper | 47/79 |
| 2,878,671 | 3/1959 | Prosser et al. | 73/73 |
| 2,929,241 | 3/1960 | Gebhart | 73/73 |
| 3,438,383 | 4/1969 | Gorlin | 137/78.2 |
| 3,926,143 | 12/1975 | Hothan | 73/73 |
| 4,171,593 | 10/1979 | Bigglestone | 47/79 |
| 4,201,080 | 5/1980 | Slepak et al. | 73/73 |
| 4,270,309 | 6/1981 | Baumann | 47/79 |
| 4,342,224 | 8/1982 | Hara et al. | 73/73 |

FOREIGN PATENT DOCUMENTS

| | | |
|---|---|---|
| 2709793 | 9/1978 | Fed. Rep. of Germany . |
| 2460103 | 1/1981 | France . |
| 2614417 | 10/1988 | France . |

*Primary Examiner*—William A. Cuchlinski, Jr.
*Assistant Examiner*—G. Bradley Bennett
*Attorney, Agent, or Firm*—Bacon & Thomas

[57] ABSTRACT

The device for determining the quantity of water required by a cultivation medium placed in a tray (100), comprises a vertically disposed measuring wheel (10) mounted on a vertical partition (106) in such a manner as to be free to rotate about a horizontal axis (19), while being unbalanced. The bottom portion of the measuring wheel (10) is situated a few millimeters from the bottom of the tank of the tray. The measuring wheel comprises a first portion (14) which is not very hydrophilic and which has a mean relative density of less than unity, and a second portion provided with hydrophilic means (13) that cause the unbalance of the wheel to vary as a function of the quantity of water retained in the hydrophilic means (13). The measuring device includes display means (15) for displaying the angular position of the measuring wheel (10), thereby providing an indication of the watering requirements of the medium.

17 Claims, 5 Drawing Sheets

DEVICE FOR DETERMINING THE QUANTITY OF WATER REQUIRED BY A CULTIVATION MEDIUM, AND A PLANT TRAY ADAPTED TO IMPLEMENTING THE DEVICE

The present invention relates to a device enabling the quantity of water required for maintaining a proper moisture level in a cultivation medium placed in a tray to be determined by a direct reading.

The invention also relates to a plant tray specially adapted to implement the device for determining the quantity of water required by a cultivation medium placed in the tray.

In the prior art, the amount of water to be applied to a cultivation medium and the frequency of watering are not obvious. Only a specialist can determine the requirements of the medium merely from its appearance and from its feel.

There exist plant pots having water reserves and including a device for displaying the water level in the bottom thereof. The main drawback of this type of plant tray is the time required to acclimatize a plant. On average it takes two months for the roots to be able to draw water from the bottom of the tray. Traditional watering from above is essential during this period.

There also exist various types of apparatus whose operation is based on detecting the moisture content of compost. Such apparatuses are complex, and are not suitable for domestic use. They are expensive due to the sophisticated design of apparatuses of this type, and they are intended essentially for industrial growers.

Methods and devices that work by weighing are also known, such as those described in French patent document number 2 614 417, which for proper operation requires components that are strong, thereby giving rise to a cost that is hardly compatible with generalized domestic usage. In addition, rating is required to take account of the water retention percentages of the mediums used for cultivation purposes. Such rating requires knowledge known only to the person skilled in the art.

The invention seeks to make it possible to indicate reliably the quantities of water that need to be applied to a plant tray in order to maintain good growth while using a device that is simple, cheap, and convenient to use.

Another object of the invention is to enable growing plants to be sold, in particular aromatic plants and flowering plants, and it relates to plant trays adapted to industrialized handling and to the requirements of self-service distribution, and specially adapted to implementing devices of the invention for displaying watering requirements.

These objects are achieved by a device for determining the quantity of water required by a cultivation medium placed in a tray, which device is characterized by the following points:

a) it comprises a measuring wheel disposed vertically and mounted on a vertical partition so as to be free to rotate about a horizontal axis, while presenting an unbalance;

b) the bottom portion of the measuring wheel is situated a few millimeters from the bottom of the tank of the tray;

c) the measuring wheel comprises a first portion which is not very hydrophilic and which has a mean relative density that is less than unity, and a second portion provided with hydrophilic means which cause the unbalance of the wheel to change as a function of the quantity of water retained in the hydrophilic means; and d) the measuring wheel is fitted with display means for displaying the angular position of the measuring wheel.

In a possible first embodiment, the unbalance of the measuring wheel is created by its horizontal axis being eccentric (e) relative to the geometrical axis of the measuring wheel.

In a second embodiment, which may indeed be combined with the first embodiment, the unbalance of the measuring wheel is created by an additional mass applied to a localized peripheral region of the measuring wheel.

In an embodiment that is particularly advantageous because it is simple to implement, said first portion that is not very hydrophilic is made of a lightweight material of density less than that of water, in the form of a disk in which a notch is formed, and in which said second portion comprises a hydrophilic item constituted by sponge material fixed in said notch by gluing.

Said second portion may extend over an angular sector lying in the range about 30° to about 90°.

In a variant embodiment, the outside shape of the measuring wheel is not entirely circular, thereby defining a rocker having a first stable angular position when dry and angular positions different from the first position caused by a change in the center of gravity of the measuring wheel when said hydrophilic means are moist.

Advantageously, in this case, said first portion that is not very hydrophilic is constituted in the form of a plate of lightweight material whose density is less than that of water, and said second portion comprises a hydrophilic item constituted by sponge material fixed to a portion of the periphery of said plate over an angular sector lying in the range about 45° to about 100° relative to the axis of rotation of the measuring wheel.

According to a particular characteristic, the rocker-shaped measuring wheel selectively hides indications, marks, or pictograms formed on the partition supporting the measuring wheel depending on its angular position.

Said second portion may have a color different from that of said first portion, thereby constituting said display means for displaying the angular position of the measuring wheel.

Said second portion may be disposed at least in part in the vicinity of the portion of the measuring wheel that is located at the top in the absence of water in the tank of the tray, and is kept in a low position when water is present.

In another possible embodiment, said first portion that is not very hydrophilic is constituted by a waterproof compartment in the form of a portion of a disk, optionally containing a lining of lightweight material, such that the mean relative density of said first portion remains less than unity.

According to a particular characteristic of the invention, said second portion includes at least a few grains of water-retaining material whose volume increases greatly in the presence of water.

The invention also provides a plant tray adapted to implementing a device for determining the quantity of water required by a cultivation medium, characterized in that it comprises a main compartment for receiving the cultivation medium and plants to be cultivated, and an auxiliary compartment separated from the main compartment by a vertical partition whose bottom portion allows water to pass therethrough and which supports a measuring wheel disposed vertically in the auxiliary compartment, the measuring wheel being mounted on said vertical partition in such a manner as to be able to rotate freely about a horizontal axis while nevertheless having an unbalance, the bottom portion of the measuring wheel being situated a few millimeters from the bottom of the tank of the tray, the measuring wheel comprising a first portion that is not very hydrophilic and that has a mean relative density less than unity, and a second portion provided with hydrophilic means causing the unbalance of the wheel to vary as a function of the quantity of water retained in the hydrophilic means, with the measuring wheel or the auxiliary compartment being fitted with display means for displaying the angular position of the measuring wheel.

According to the invention, determining and displaying the quantity of water required for watering the plants present in the plant tray is thus performed simply by the hydrophilic portion of the measuring wheel. This hydrophilic portion is placed in the same atmospheric conditions as the cultivation medium and its rate of evaporation varies in parallel with that of the medium, with the drying out thereof changing the unbalance of the measuring wheel and causing it to rotate, thereby making it possible, e.g. by means of markers or symbols on the periphery of the measuring wheel or by means of markers or symbols formed on the partition supporting the measuring wheel and selectively hidden or revealed by the measuring wheel, both to follow accurately and easily any variations in the quantity of water that needs to be added to achieve the ideal degree of moisture for cultivation, and to top up the water from time to time without applying too much water.

Other characteristics and advantages of the invention appear from the following description of particular embodiments given by way of non-limiting example and with reference to the accompanying drawings, in which.

Figure 1:
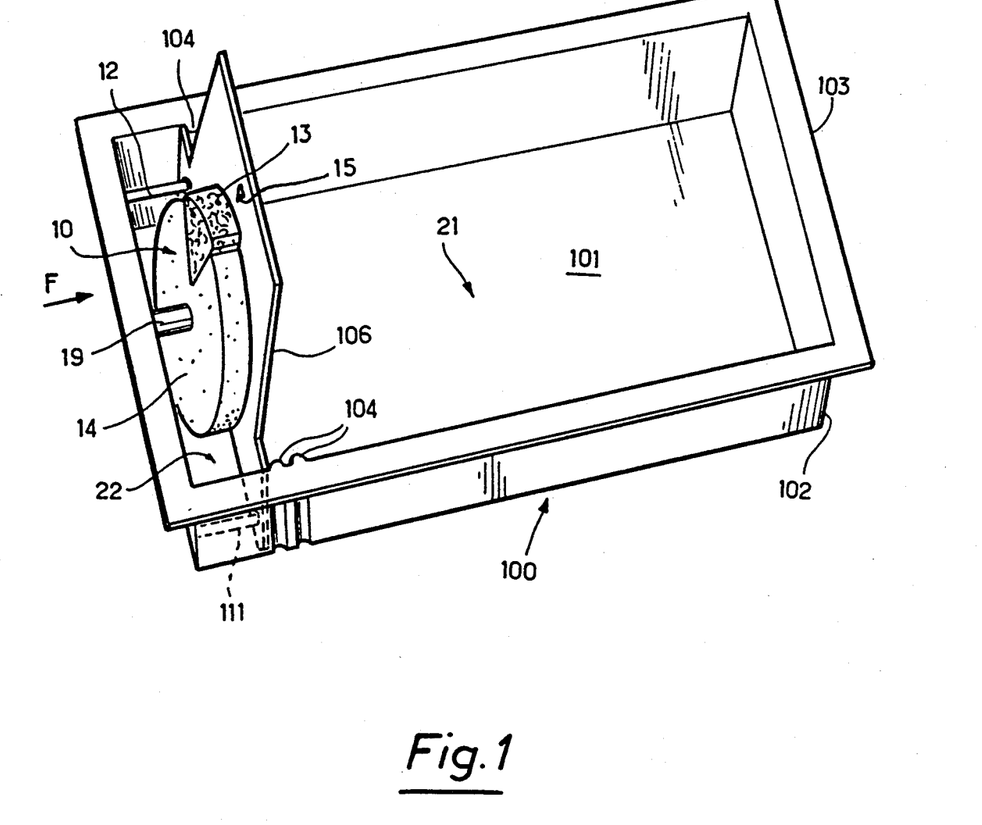
FIG. 1 is a perspective view of a plant tray of the invention fitted with a device for determining water quantity constituting a first embodiment of the invention.

With reference initially to FIG. 1, there can be seen a plant tray 100 which may be made of plastic and may be designed to be discarded after use or on the contrary to be reusable. The tray 100 has a bottom 101, side walls 102, and a top horizontal rim 103.

A preferably-removable partition 106 which may also be made of plastic divides the inside volume of the tray 100 into a first compartment 21 for receiving a medium for cultivating plants or flowers, and a second compartment 22 of smaller size for receiving a device for determining the quantity of water required by the cultivation medium placed in the main compartment 21.

For example, the partition 106 may be held in position by means of vertical ribs 104 formed in the side walls of the tray 100. The partition 106 may also carry pegs 111 and 112 on its front face and may be secured between ribs 104 formed on vertical walls 102 perpendicular to the partition 106 and the vertical wall of the tray 100 parallel to the partition 106 and delimiting the compartment 22, with the pegs 111 and 112 then acting as spacers. The partition 106 preferably includes a portion 108 which extends beyond the top rim 103 of the tray and which prevents plants bearing against the device for measuring water quantity.

Figure 2:
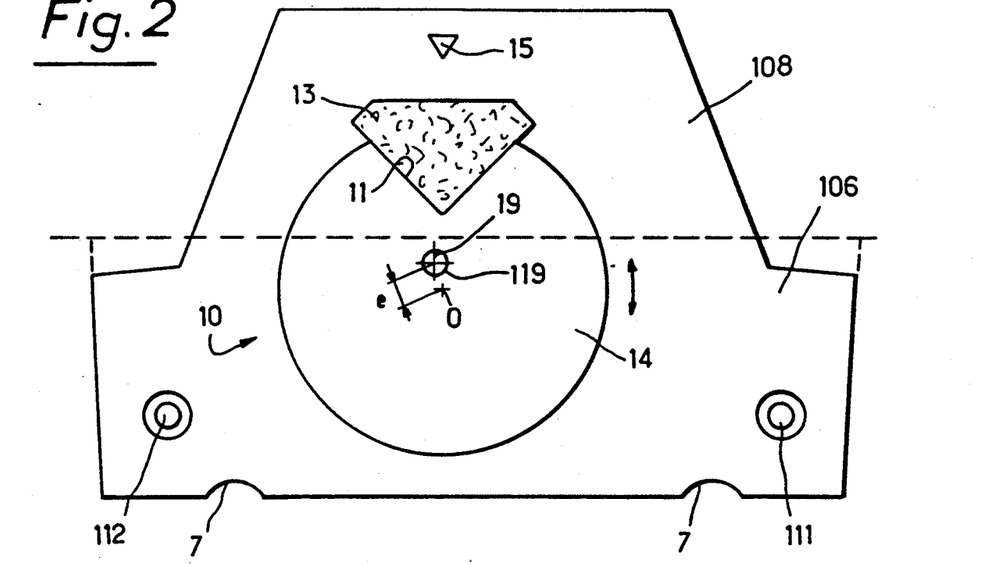
FIGS. 2 and 3 are views along arrow F in FIG. 1 with the body of the plant tray removed, showing a first embodiment of a device for determining water quantity respectively in a water shortage position and in a water saturation position.
Figure 3:
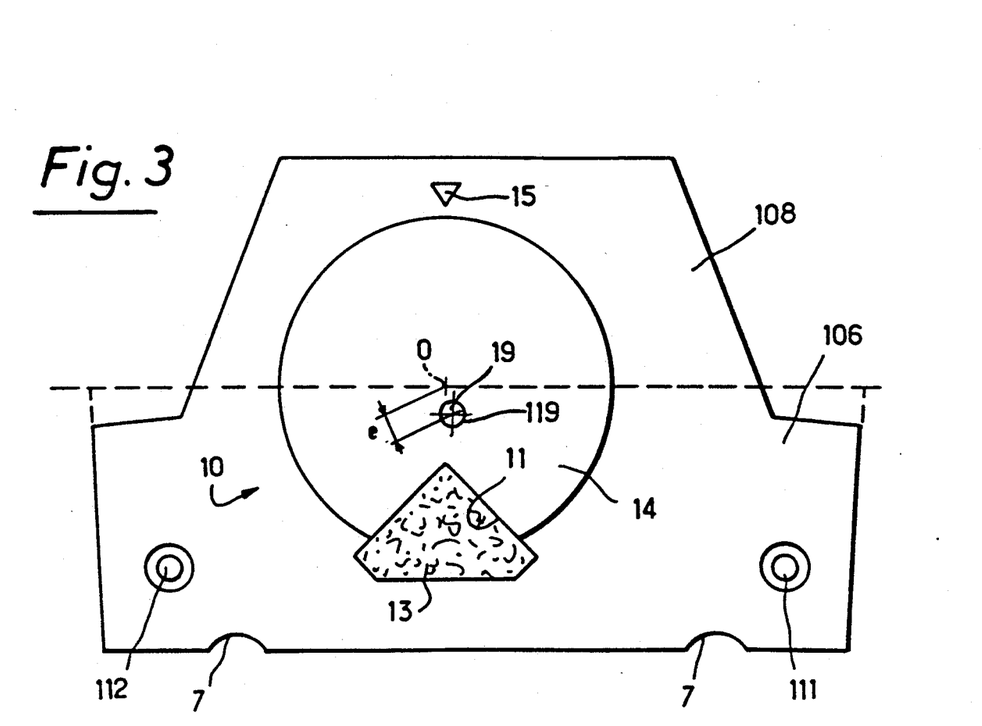

The partition 106 must not be completely water-tight, and for example it may include openings or notches 7 in the vicinity of its bottom edge (FIGS. 2 and 3). The partition 106 may also rest on ribs formed in the bottom of the tray 100 and extending perpendicularly to the partition 106.

A first example of the device for determining the quantity of water required for maintaining proper moisture in the medium placed in the main compartment 21 of the tray 100 is now described with reference to FIGS. 1 to 3.

The device of the invention for determining the quantity of water required essentially comprises a measuring wheel 10 mounted vertically so as to be capable of rotating freely about a horizontal shaft 19 fixed on the vertical partition 106. Where appropriate, the height of the shaft 19 may be adjustable.

The measuring wheel 10 is positioned in the compartment 22 of the plant tray 100 so that the bottom portion of the measuring wheel 10 is at a distance of a few millimeters from the bottom of the tank in the tray. The measuring wheel 10 is made so as to present an unbalance when dry such that when dry it places itself in a predetermined angular position such as that shown in FIGS. 1 and 2.

The measuring wheel 10 is essentially constituted by a first portion 14 which is not very hydrophilic and having a mean density that is less than that of water, i.e. having a relative density of less than unity, and a second portion 13 which essentially comprises hydrophilic means for varying the unbalance of the measuring wheel 10 as a function of the quantity of water retained in the hydrophilic means.

More particularly, in the embodiment of FIGS. 1 to 3, the first portion 14 is constituted by a disk made of a single piece of material that is lighter than water and that is not very hydrophilic, e.g. such as cork, expanded polystyrene, or a cellular material such as a polyurethane foam having closed cells, for example. This first portion 14 in the form of a disk is pierced by an orifice 119 through which the horizontal support shaft 19 passes. In addition, a notch 11 is formed in a portion of the periphery of the disk 14 to enable the hydrophilic means 13 to be inserted, which means may be constituted in the simplest embodiment merely by a piece of sponge material glued in the notch 11.

A small weight may be applied to the disk-shaped portion 14 that is not very hydrophilic at a position that is on its side diametrically opposite to the notch 11 about the shaft 19 so as to maintain the measuring wheel 10 in its FIG. 1 position when dry, i.e. with its dry hydrophilic material 13 at the top. One or more marks 15 may be formed on the partition 106 to mark the angular position of the measuring wheel 10. The portion 13 made of sponge material, such as polyurethane foam having open cells, for example, may itself be of a color or an appearance that is different from the body of the disk 14 so as to facilitate marking the angular position of the measuring wheel relative to the fixed marks 15.

In a variant, and in order to avoid using a weight, the measuring wheel 10 may be mounted eccentrically as shown in FIGS. 2 and 3.

The orifice 119 of the disk 14 through which the horizontal shaft 19 may thus be offset by a distance e from the geometrical axis O of the disk 14, thereby ensuring that the wheel 10 takes up the position shown in FIG. 2 with the hydrophilic material 13 at the top when the hydrophilic material 13 is dry. When water is placed in the plant tray, the disk 14 of lightweight material will tend to float on the water present in the bottom of the compartment 13, thereby attenuating its unbalance and causing the measuring wheel 10 to rotate so as to bring its hydrophilic material 13 into contact with the water. The hydrophilic material 13 absorbs the water and the resulting increase in its weight keeps the measuring wheel in the position shown in FIG. 3, i.e. with the hydrophilic material 13 at the bottom for so long as it remains saturated with water. During evaporation of the water and the progressive drying out of the hydrophilic means 13, which corresponds to the cultivation medium drying out, the mass of the hydrophilic means 13 will become smaller such that the measuring wheel will return progressively to the FIG. 2 position indicating that more water is required.

The hydrophilic means 13 may be adapted to the nature of the cultivation medium and of the plants contained in the main compartment 21 of the plant tray. In particular, the volume of the sponge material constituting the hydrophilic means 13 may be adapted to different conditions of use.

In addition, the hydrophilic means 13 may contain one or more grains of a water-retaining material, for example, a polymer such as polyacrilamide or a product obtained by culturing bacteria of the polysaccharide family, with the water retainer having the property of greatly increasing in weight and in volume in the presence of water, which phenomenon is reversible.

It may be observed that the measuring device shown in FIGS. 1 to 3 can be made in a manner that is extremely simple and cheap. Thus, a cylinder of lightweight material that is not very hydrophilic, such as cork or expanded polystyrene for example, is easily perforated to make a channel forming an orifice 119, and then partially cut out to form a longitudinal notch 11. Sponge material optionally with a small quantity of water retainer may be fitted in the longitudinal notch, e.g. by gluing, to constitute the hydrophilic material 13. The resulting assembly is then merely sliced up to form a series of measuring wheels 10 such as the wheels shown in FIGS. 1 to 3.

The partitions 106 are also easily mass produced in plastic, being optionally provided with notches or openings 7 in their bottom portions. Plastic studs 19, 111, and 112 may be fixed, e.g. by gluing, to each partition to constitute the shaft 19 that supports the measuring wheel 10, and the spacers for positioning the partition 106 in the plant tray 100.

The plant tray assembly 100 fitted with its measuring device may be designed to be discarded after use, given its low cost, however it could also be reusable since it constitutes an assembly that is relatively robust.

Numerous variants are possible.

Figure 9:
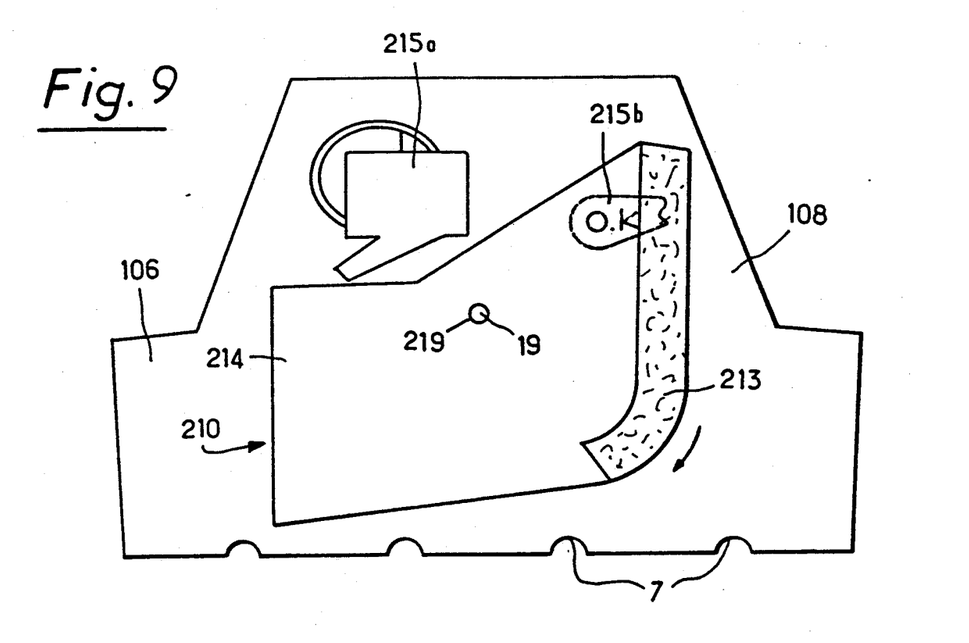
FIGS. 9 and 10 are views analogous to FIGS. 2 and 3 showing a variant embodiment of the device for determining water quantity respectively in a water shortage position and in a water saturation position.
Figure 10:
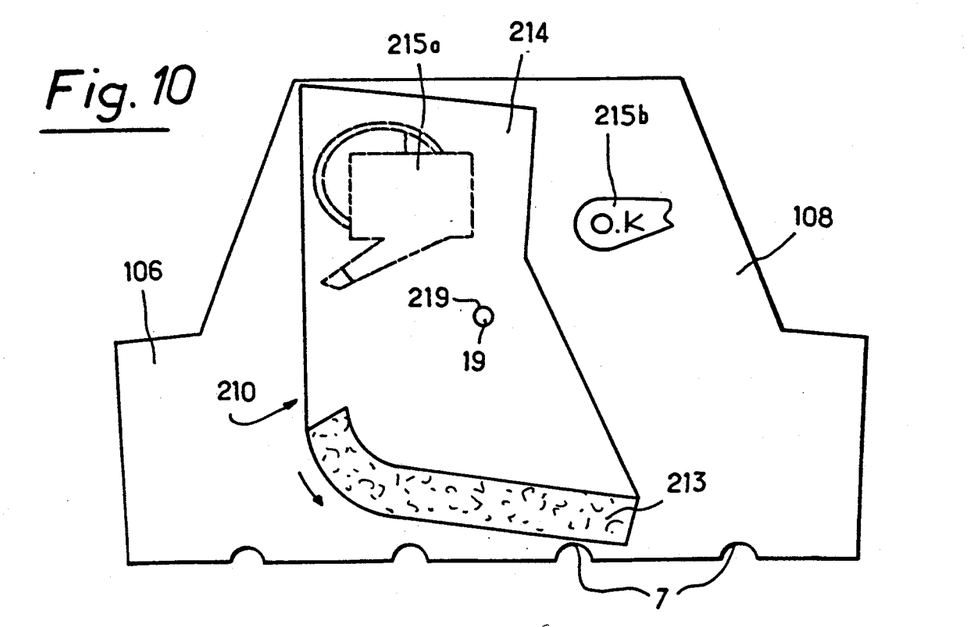

Thus, FIGS. 9 and 10 show a measuring wheel 210 whose outside shape is not entirely circular, thereby constituting a rocker which may be bootee-shaped, for example. Under such circumstances, the measuring wheel 210 is still unbalanced when dry, i.e. it is suspended from a horizontal shaft 19 received in an orifice 219 that does not coincide with the center of gravity of the measuring wheel, thereby defining a first stable angular position (FIG. 9). This first angular position corresponds to water shortage and thus causes an indication to this effect to appear. The indication may be constituted by at least a portion of the hydrophilic means 213 reaching a high position, which hydrophilic means may have a distinctive color, or else it may be constituted by a mark on the edge of the measuring wheel, or indeed by a reference symbol or pictogram 215a formed on the top portion 108 of the partition 106 and uncovered by the measuring wheel 210 when in its dry position. Thus, FIG. 9 shows a drawing 215a of a watering can indicating that the plants need watering.

When the hydrophilic means 213 is full of water, its weight increases and it causes the rocker wheel 210 to take up the position shown in FIG. 10 when saturated with water.

In the FIG. 10 position, the hydrophilic means 213 is in its bottommost position and the water-shortage indication 215a is hidden by the lightweight and not very hydrophilic portion 214 of the wheel 210, while another indication 215b such as the message "OK" is revealed to indicate that sufficient water is available. Naturally, various intermediate positions are possible between the positions of FIGS. 9 and 10 when some of the water has evaporated but without the cultivation medium and the hydrophilic means 213 being completely dry.

The measuring wheel 210 may be made in the same way as for the embodiment of FIGS. 2 and 3 by means of a plate of lightweight material of relative density less than unity for constituting the portion 214 that is not very hydrophilic, and by a hydrophilic item 213 constituted by sponge material fixed to the periphery of the plate 214.

The sponge material 213 is preferably disposed over an angular sector centered on the axis of rotation 119 and extending over a range of about 45° to 100°. As can be seen in FIGS. 9 and 10, the hydrophilic item 213 may be in the form of a sole placed at the bottom of the bootee-shaped plate 214. In the water-saturated position, the sponge material 213 located near the bottom of the tray and full of water holds the measuring wheel in the vertical position.

In contrast, in the dry position, the measuring wheel 210 returns to the prone position of FIG. 9, because of the reduction in the weight of the sponge material constituting the hydrophilic means 213. The hydrophilic means is then substantially vertical and when water is added, even in very small quantities, the "heel" of the sole-shaped hydrophilic means 213 absorbs water which can rise by capillary causing the position of the measuring wheel 210 to change.

FIGS. 4 to 8 show a measuring wheel of the type that is somewhat different from the measuring wheel 10 of FIGS. 1 to 3 or the measuring wheel 210 of FIGS. 9 and 10, even though it operates on a similar principle.

In the embodiment of FIGS. 4 to 8, the measuring wheel 1 has a first compartment 4 which may occupy between about 50% and about 75% of the volume of the measuring wheel 1, and which constitutes a compartment having a mean relative density of less than unity. The compartment 4 may be empty and watertight, or it may be filled with a material that is lightweight and impermeable, i.e. that is not very hydrophilic.

A weight constituting a counterweight may be disposed in localized manner in the bottom of the compartment 4 to establish an unbalance.

Figure 6:
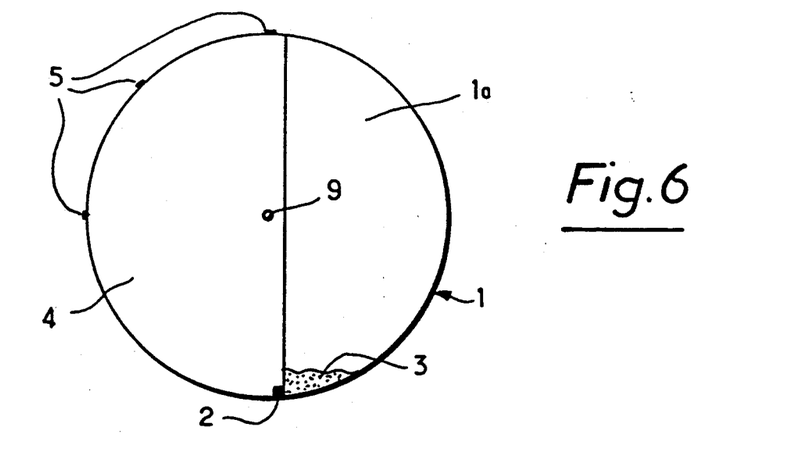
FIGS. 6 to 8 are front views of a measuring wheel as used in the embodiment of FIGS. 4 and 5, shown in positions corresponding respectively to total water shortage, to partial water shortage, and to water saturation.

A second compartment 1a which occupies the volume left unoccupied by the first compartment 4 constitutes a supply that is not waterproof, in which a small quantity of water-retaining substance 3 such as the substances mentioned above is placed, e.g. in the vicinity of the weight 2, which substance has small volume and low mass when dry such that the measuring wheel 1 is then maintained in the position shown in FIG. 6 because of the unbalance established by the weight 2. In the presence of moisture, the water retainer 3 increases considerably in volume and in weight and tends to occupy an ever increasing fraction of the compartment 1a, thereby increasing the mean density of the compartment 1a such that the unbalance of the measuring wheel 1 is changed, and depending on the quantity of water present, the measuring wheel 1 is rotated about its shaft 9 fixed to the partition 6 of a plant tray 1 which may be analogous to that described with reference to FIG. 1.

Figure 7:
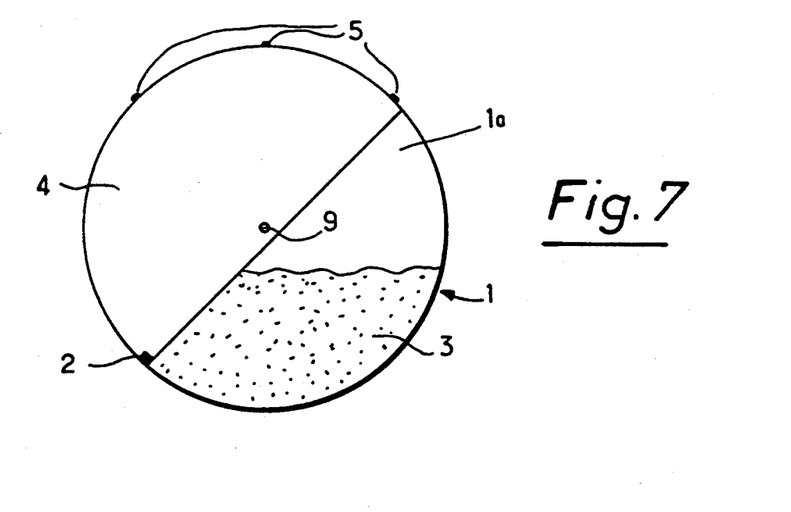
Figure 8:
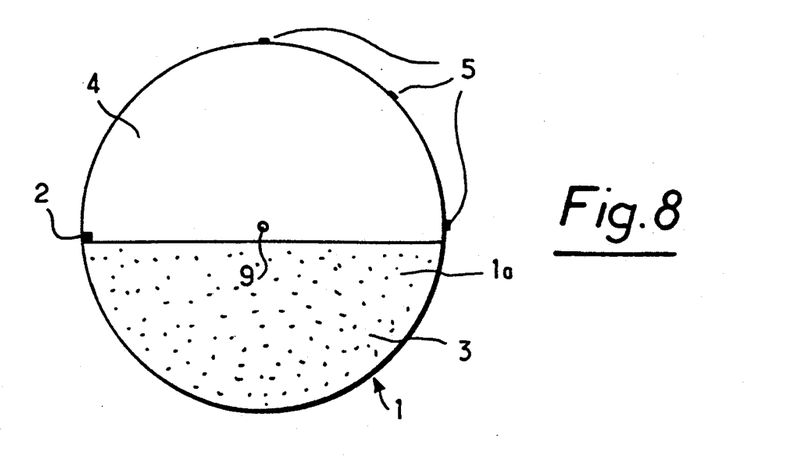

Visual indication means 5 are disposed on the periphery of the measuring wheel 1 so as to enable the angular position of the wheel 1 to be observed, which angular position is a function of the quantity of water taken into account by the water retainer 3.

FIG. 8 thus corresponds to water saturation, while FIG. 7 corresponds to a limited quantity of water being present, and FIG. 6 corresponds to total absence of moisture.

When the water retainer 3 is dry (FIG. 6), the mass of the weight 2 keeps the device 1 in a position which is marked by a top one of the marks 5. This mark 5 may advantageously be associated with an indication of the volume of water that needs adding to the tray.

On coming into contact with water, the water retainer 3 increases in weight and in volume and causes the device to rotate (FIGS. 7 and 8).

When the water subsequently evaporates, the weight of the water retainer 3 reduces and the device returns to its initial position (FIG. 6).

Figure 4:
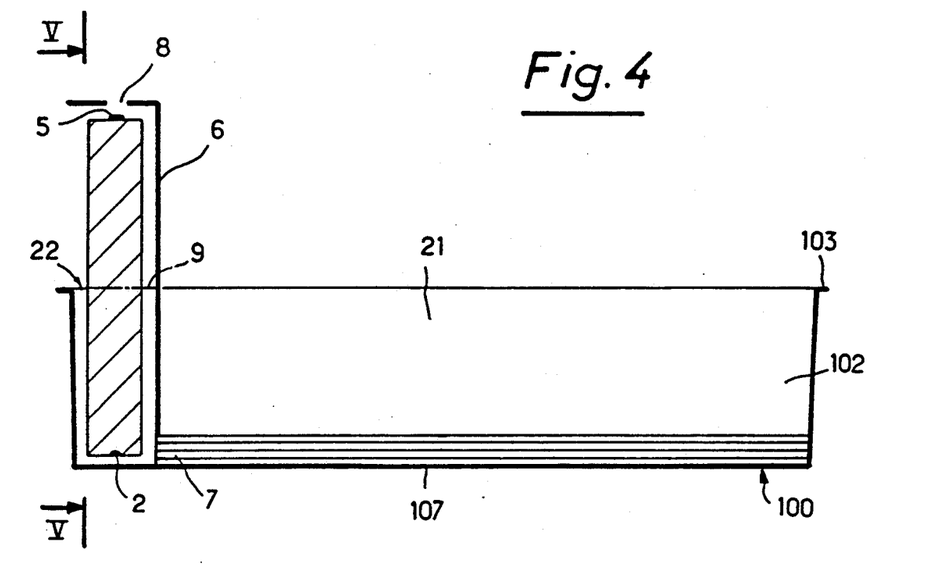
FIGS. 4 and 5 are diagrammatic section views respectively on line IV—IV of FIG. 5 and on line V—V of FIG. 4 showing a plant tray of the invention fitted with a device for determining water quantity constituting a second embodiment of the invention.
Figure 5:
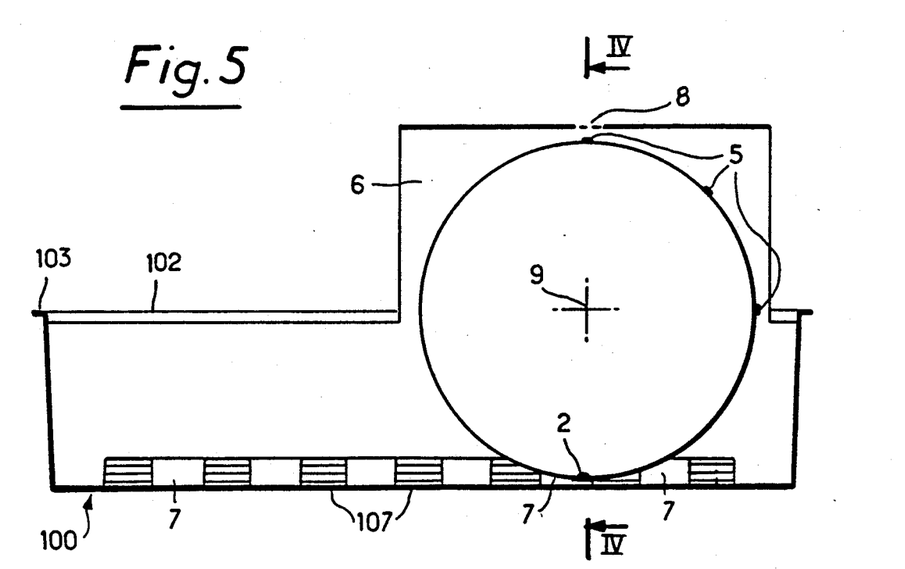

FIGS. 4 and 5 are sketches showing a tray 100 fitted with the above-described embodiment of a device for determining a quantity of water.

The tray 100 is fitted with longitudinal ribs 107.

A moving partition 6 extends perpendicularly to the ribs and has openings 7 in its base, the top of the partition is terminated by a cover for preventing the vegetation coming into contact with the moving wheel 1 of the device as supported by the horizontal shaft 9 supported by the partition 6.

An opening 8 is formed through the top of the cover enabling the indications 5 written on the edge of the rotary wheel 1 of the device to be read.

Inside the compartment 21, the space between the ribs 107 is filled with a substrate having a high water retention coefficient (e.g. vermiculite, peat).

The water retainer 3 has water retention characteristics similar to that of the substrate placed in the compartment 21 and finds itself in the same atmospheric conditions such that its rate of evaporation is similar and as a result the rotation of the measuring wheel 1 caused by the varying unbalance generated by the water retainer 3 drying out enables the variations in the quantity of water that needs to be added to achieve ideal moisture in the plant tray 100 to be followed by means of the marks, thereby making the tray particularly well adapted to home use with decorative or aromatic plants.

I claim:

1. A device for determining the quantity of water required by a cultivation medium placed in a tray (100), the device comprising a measuring wheel (1; 10) disposed vertically and mounted on a vertical partition (6; 106) so as to be free to rotate about a horizontal axis (9; 19), while presenting an unbalance, the bottom portion of the measuring wheel (1; 10) being situated a few millimeters from the bottom of the tank of the tray, said measuring wheel comprising a first portion (4; 14) which is relatively unhydrophilic and which has a mean relative density that is less than unity, and a second portion provided with hydrophilic means (3; 13) which cause the unbalance of the wheel to change as a function of the quantity of water retained in the hydrophilic means (3; 13), and wherein the measuring wheel (1; 10) includes display means (5; 15) for displaying the angular position of the measuring wheel (1; 10).

2. A device according to claim 1, wherein the unbalance of the measuring wheel (10) is created by the horizontal axis (19) being disposed eccentric (e) relative to the geometrical axis (0) of the measuring wheel (10).

3. A device according to claim 1 wherein the unbalance of the measuring wheel (1) is created by an additional mass (2) applied to a localized peripheral region of the measuring wheel (1).

4. A device according to claim 1 wherein said first portion (14) that is relatively unhydrophilic is made of a lightweight material of density less than that of water, and in the form of a disk in which a notch (11) is formed, and in which said second portion (13) comprises a hydrophilic element constituted by sponge material fixed in said notch (11) by adhesive.

5. A device according to claim 1, wherein said second portion (13) extends over an angular sector lying the range about 30° to about 90°.

6. A device according to claim 1 wherein the outside shape of the measuring wheel (210) is not entirely circular, thereby defining a rocker having a first stable angular position when dry and angular positions different from the first position caused by a change in the center of gravity of the measuring wheel (210) when said hydrophilic means (213) are moist.

7. A device according to claim 6, wherein said first portion (214) that is relatively unhydrophilic comprises a plate of lightweight material whose density is less than that of water, and in that said second portion (213) comprises a hydrophilic element constituted by sponge material fixed to a portion of the periphery of said plate (214) over an angular sector lying in the range about 45° to about 100° relative to the axis of rotation (19) of the measuring wheel (210).

8. A device according to claim 6, said partition bearing indicia and wherein the rocker-shaped measuring wheel (210) includes means for selectively hiding said indicia, depending on its angular position.

9. A device according to claim 4 wherein said second portion (13; 213) has a color different from that of said first portion (14; 214), thereby constituting said display means for displaying the angular position of the measuring wheel (10; 210).

10. A device according to claim 1 wherein said first portion (14) that is relatively unhydrophilic comprises a waterproof compartment in the form of a portion of a disk, such that the mean relative density of said first portion (14) remains less than unity.

11. A device according to claim 1 wherein said second portion (3; 13) includes at least a few grains of water-retaining material whose volume increases greatly in the presence of water.

12. A device according to claim 1 wherein said second portion (3; 13; 213) is disposed at least in part in the vicinity of the portion of the measuring wheel (1; 10; 210) that is located at the top in the absence of water in the tank of the tray, and is kept in a low position when water is present.

13. A device according to claim 1 wherein the bottom portion of the partition (6; 106) supporting the measuring wheel is provided with orifices or notches (7) allowing water to pass.

14. A plant tray adapted to implement a device for determining the quantity of water required by a cultivation medium, said tray comprising a main compartment (21) for receiving the cultivation medium and plants to be cultivated, and an auxiliary compartment (22) separated from the main compartment (21) by a vertical partition (6; 106) whose bottom portion allows water to pass therethrough and which supports a measuring wheel (1; 10) disposed vertically in the auxiliary compartment (22), the measuring wheel being mounted on said vertical partition in such a manner as to be able to rotate freely about a horizontal axis while nevertheless having an unbalance, the bottom portion of the measuring wheel (1; 10) being situated a few millimeters from the bottom of the tank of the tray, the measuring wheel comprising a first portion (4; 14) that is relatively unhydrophilic and that has a mean relative density less than unity, and a second portion provided with hydrophilic means (3; 13) causing the unbalance of the wheel to vary as a function of the quantity of water retained in the hydrophilic means (3; 13), with the measuring wheel (1; 10) or the auxiliary compartment (22) including display means (5; 15) for displaying the angular position of the measuring wheel (1; 10).

15. A plant tray according to claim 14, wherein the tray includes ribbed walls and wherein the vertical partition (6; 106) is removable and co-operates with the ribs (104) of the walls of the tray.

16. A plant tray according to claim 14 wherein said tray is made of plastic.

17. A device according to claim 10, wherein said waterproof compartment contains a lining of lightweight material.

* * * * *